United States Patent [19]

Akabane et al.

[11] Patent Number: 4,834,283

[45] Date of Patent: May 30, 1989

[54] AUTOMOTIVE AIR CONDITIONING SYSTEM

[75] Inventors: Hidemitsu Akabane, Takasaki; Toshimi Isobe, Isesaki; Seiichi Hoshino, Nitta, all of Japan

[73] Assignee: Sanden Corporation, Gunma, Japan

[21] Appl. No.: 221,880

[22] Filed: Jul. 20, 1988

[30] Foreign Application Priority Data

Jul. 20, 1987 [JP] Japan ............................ 62-110012[U]

[51] Int. Cl.⁴ ........................................... G05D 23/13
[52] U.S. Cl. ..................................... 236/13; 236/49.5; 251/129.12; 318/468
[58] Field of Search ................. 62/244; 236/13, 49 D; 251/129.11, 129.12; 318/467, 468

[56] References Cited

U.S. PATENT DOCUMENTS

| | | | |
|---|---|---|---|
| 3,914,676 | 10/1975 | Madonian et al. | 251/129.12 X |
| 3,934,642 | 1/1976 | Coulson et al. | 165/23 |
| 4,099,704 | 7/1978 | Okumura et al. | 251/129.12 |
| 4,513,808 | 4/1985 | Ito et al. | 165/43 |
| 4,593,852 | 6/1986 | Tajima et al. | 237/12.3 A |
| 4,723,102 | 2/1988 | Oppermann et al. | 251/129.12 X |

Primary Examiner—William E. Tapolcai
Attorney, Agent, or Firm—Banner, Birch, McKie & Beckett

[57] ABSTRACT

A damper position control device for an automotive air conditioning system having a lock release mechanism for the drive shaft of a motor which controls the angular position of an air mix damper. A damper position control device is disclosed which controls the angular position of an air mix damper. The damper position control device includes a motor actuator which drives the air mix damper and a control circuit. The motor actuator includes a drive motor for the air mix damper and a rotation control device including a regulator which regulates the upper and lower rotational limits of the shaft of the drive motor and a position detector which detects the rotational angle of the shaft. The control circuit controls the motor actuator in accordance with a plurality of detected signals. The control circuit generates a drive signal which drives the motor actuator and further includes a lock detector which detects if the shaft of the motor is locked against rotational motion in a first rotational direction. The control circuit also includes a lock release which releases the motor so as to permit rotational motion in a second rotational direction after the motor as been locked against rotational motion in the first rotational direction if the motor is within a first predetermined angular displacement from the upper rotational limit or within a second predetermined angular displacement from a lower rotational limit and if the drive signal causes the motor to rotate in the second rotational direction.

1 Claim, 3 Drawing Sheets

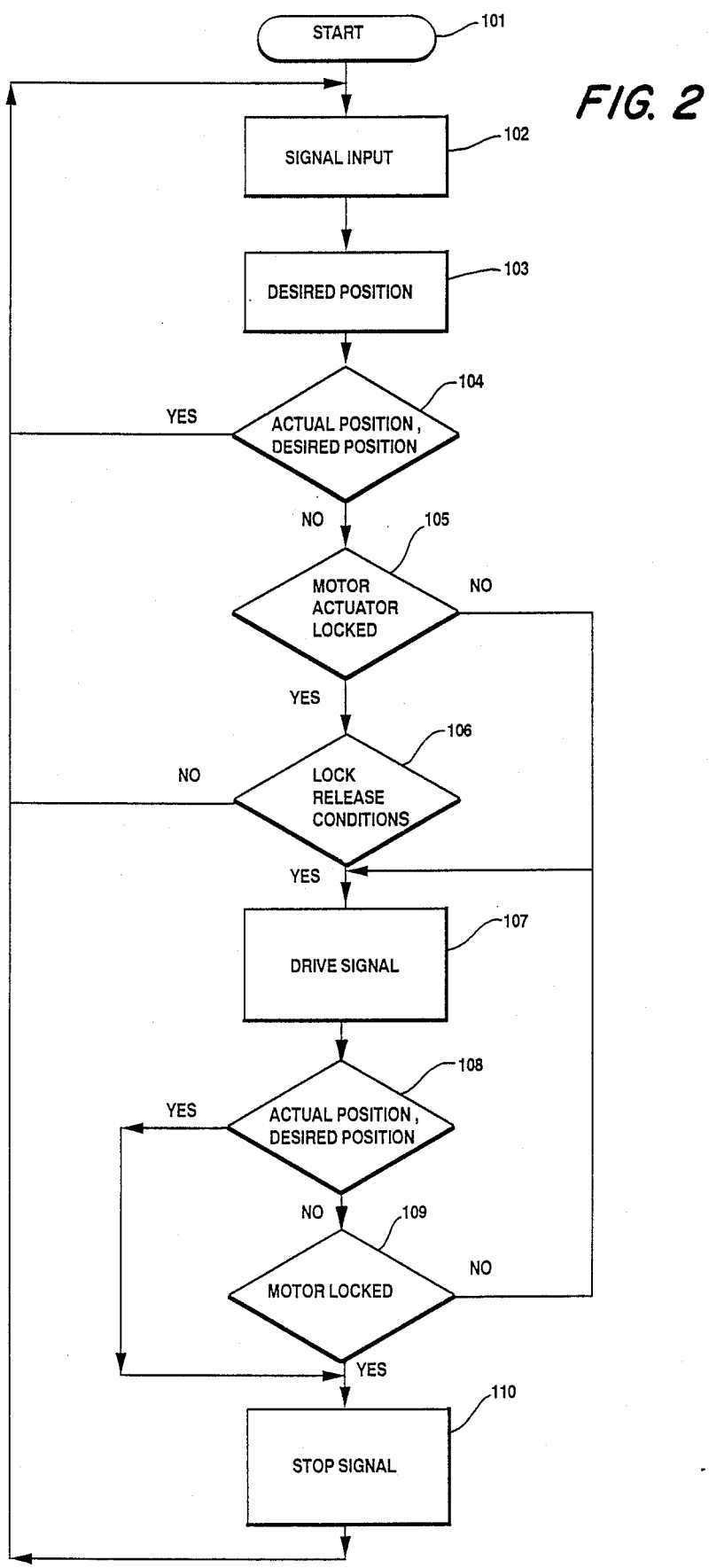

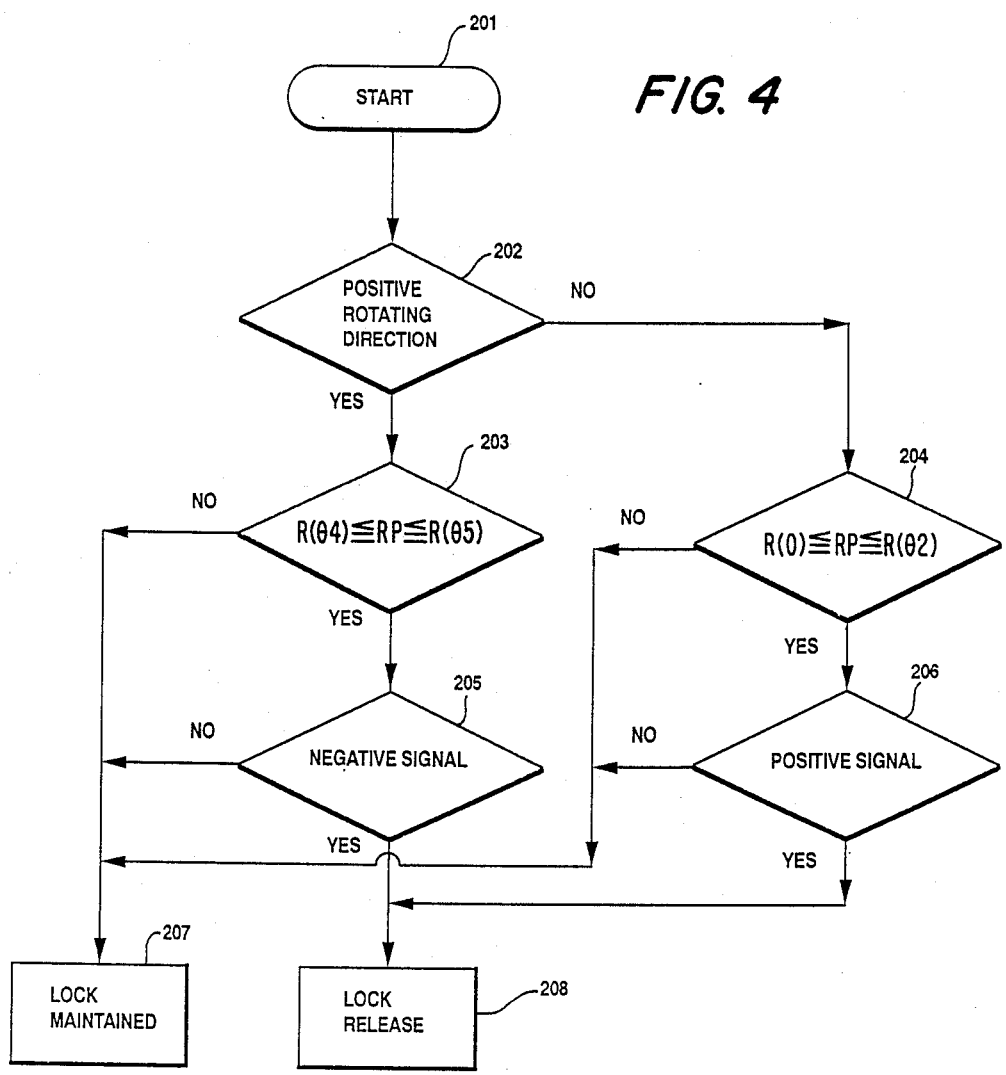

AUTOMOTIVE AIR CONDITIONING SYSTEM

This application is related by subject matter to commonly assigned copending application Ser. No. 220,740 filed July 18, 1988 having common inventors with the subject application and application Ser. No. 221,879 filed concurrently herewith having common inventors with subject application.

TECHNICAL FIELD

This invention generally relates to an automotive air conditioning system, and more particularly, to a damper position control device for an automotive air conditioning system having a lock release mechanism for the drive shaft of a motor which controls the angular position of an air mix damper.

BACKGROUND OF THE INVENTION

In a conventional automotive air conditioning system of the type which includes an automatic temperature control function, a temperature control circuit is normally provided to control the angular position of an air mix damper to thereby control the temperature of the air blown into a compartment. By controlling the angular position of the air mix damper, the temperature control circuit adjusts the mixture of cool air and heated air directed into the compartment. The temperature control circuit computes the desired open angular position of an air mix damper as a function of a predetermined temperature, an outside air temperature and an inside air temperature.

The air mix damper generally is rotatably driven by a drive device such as a motor actuator which is responsive to control signals generated by the temperature control circuit. During the operation of the above-described air conditioning system, the air mix damper can become locked and resist further changes of its angular position. Such locking may be caused by matter or objects which are accidently introduced to the air conditioning system and which inhibit damper rotation or a malfunction in the motor actuator such as a malfunction in the driving gears of the motor actuator. If such locking is not detected during operation, the motor actuator may be damaged and sufficient heat may be generated to cause a fire. In the prior art motor actuators, a lock detecting function was included to prevent damage to the motor actuator. If locking was detected, power was cut off to the temperature control circuit and further operation of the motor actuator was inhibited.

Despite the above improvement, differences in the stroke of the air mix damper and the motor actuator may still occur since the lengths of the rods and links which connect the air mix damager with the motor actuator cannot always be precisely determined. Furthermore, if an error occurs upon connection of the air mix damper to the motor actuator, the motor actuator may not be driven to its upper or lower rotational limits even if the air mix damper is completely closed or open. In this case, the drive motor of the motor actuator may become locked. Thereafter, the lock detecting function of the temperature control circuit would determine that the motor is locked, and thus the temperature control circuit would not output a drive signal for driving the drive motor of the motor actuator. Therefore, even though the locking in this case is not due to an object inhibiting the rotaton of the air mix damper or a malfunction in the driving gears, and subsequent operation of the drive motor may not result in damage to the motor, the lock detecting function will still inhibit the operation of the temperature control circuit.

SUMMARY OF THE INVENTION

It is an object of the present invention to provide a damper position control device for an automotive air conditioning system which can suitably control the temperature of the air blown out of a compartment by controlling the angular position of an air mix damper.

It is another object of the present invention to provide a damper position control device for an automotive air conditioning system which can prevent destruction of a motor actuator.

It is still another object of the present invention to provide a lock release mechanism which prevents damage to a motor actuator.

An automotive air conditioning system according to the present invention includes a damper position control device which controls the angular position of an air mix damper. The air mix damper controls the mixture of cool air and heated air to thereby control the temperature of air blown into a compartment by the air conditioning system. The damper position control device includes a motor actuator which drives the air mix damper and a control circuit. The motor actuator includes a drive motor for the air mix damper and a rotation control device including a regulator which regulates the upper and lower rotational limits of the shaft of the drive motor and a position detector which detects the rotational angle of the shaft. The control circuit generates a drive signal which drives the motor actuator in accordance with a plurality of detected signals. The control circuit also includes a detector which detects if the shaft of the motor is locked against rotational motion in a first rotational direction. The control circuit determines whether the motor is within a first predetermined angular displacement from the upper rotational limit or within a second predetermined angular displacement from the lower rotational limit. A lock release associated witih the control circuit releases the motor so as to premit rotational motion in a second rotational direction after the motor has been locked against rotational motion in the first rotational direction if the motor is within the first predetermined angular displacement from the upper rotational limit or within the second predetermined angular displacement from the lower rotational limit and if the drive signal causes the motor to rotate in the second rotational direction.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings wherein:

FIG. 2 is a flow chart for describing operation of the automotive air conditioning system as shown in FIG. 1.

FIG. 4 is a flow chart for describing the lock release of a motor.

DETAILED DESCRIPTION OF THE PREFERRED EMBODIMENT

Figure 1:
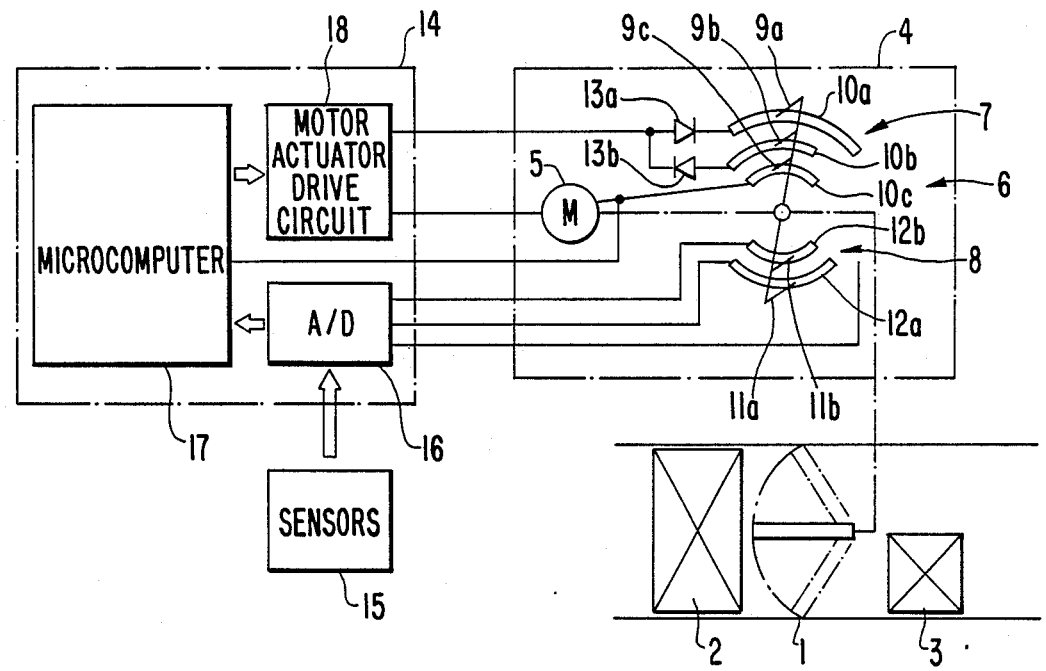
FIG. 1 is ia schematic view of an automotive air conditioning system in accordance with one embodiment of this invention.

FIG. 1 is a schematic view of an air conditioning system which includes an automatic damper position control device. Air mix damper 1 is disposed between evaporator 2 and heater core 3 in an air flow channel in which air flows in a path from evaporator 2 past air mix damper 1 and heater core 3. Air mix damper 1 controls the volume of air which flows to heater core 3 as a function of its angular position, to thereby control the temperature of the air which exits the flow channel. The damper position control device includes motor actuator control circuit 14, sensors 15, and motor actuator 4 which is operatively connected to air mix damper 1 through a wire or link to vary the angular position of air mix damper 1.

Motor actuator 4 comprises motor 5 and rotation control device 6 which controls the rotation of the drive shaft of motor 5. The drive shaft of motor 5 is operatively connected to air mix damper 1 through a wire or link. Rotation control device 6 includes a regulator 7 which regulates the upper and lower rotational limits of the drive shaft of motor 5 and position detector 8 which provides signals indicative of the rotational angle of the drive shaft of motor 5.

Regulator 7 includes movable contacts 9a, 9b and 9c and fixed contacts 10a, 10b and 10c. Movable contacts 9a, 9b, and 9c are rotationally driven in accordance with the rotation of the drive shaft of motor 5, and fixed contacts 10a, 10b, and 10c are in contact with movable contacts 9a, 9b, and 9c. Fixed contacts 10a, 10b and 10c are resistance elements formed in an arc shape. The upper and lower rotational limits of the drive shaft of motor 5 are regulated by connections between fixed contacts 10a and 10b and movable contacts 9a and 9b. Fixed contacts 10a and 10b are coupled with motor actuator control circuit 14 through diodes 13a and 13b, each of which has an opposite polarity. Fixed contact 10c is coupled with motor actuator control circuit 14 through motor 5.

Position detector 8 comprises movable contacts 11a and 11b and fixed contacts 12a and 12b. Movable contacts 11a and 11b are rotationally driven in accordance with the rotation of the drive shaft of motor 5, and fixed contacts 12a and 12b contact movable contacts 11a and 11b. Since fixed contacts 12a and 12b are formed of a resistive material, rotation of the drive shaft of motor 5 varies the resistance of position detection 8. This variable resistance varies in accordance with the rotational angle of the shaft of the motor 5, and is coupled to motor actuator control circuit 14 to provide a signal to control circuit 14 indicative of the rotational angle of the drive shaft of motor 5.

Motor actuator control circuit 14, which includes A/D converter 16, microcomputer 17 and motor actuator drive circuit 18, automatically controls the temperature of the air blown into a compartment associated with the air flow channel containing evaporator 2 and heater core 3 by operation of motor actuator 4 in accordance with a prescribed control program stored in the memory of the microcomputer. Sensors 15 include sensors such as an inside temperature sensor, an outside temperature sensor, an evaporator temperature sensor, a thermosensor for measuring the water temperature in heater core 3, an isolation sensor and a sensor responsive to the predetermined temperature selected by the user of the air conditioning system. The signals from sensors 15 and the position signals from position detector 8 are input to microcomputer 17 via A/D converter 16. Microcomputer 17 then sends control signals in accordance with the control program to motor actuator 4 through motor actuator drive circuit 18.

With reference to FIG. 2, a flow chart describing operation of the control program of motor actuator control circuit 14 is shown. After the air conditioning system is turned on at step 101, signals from sensors 15 are input to microcomputer 17 at step 102. At step 103, a desired rotational angle of the drive shaft of motor 5 is calculated in accordance with the signals of sensors 15. The actual rotational angle and the desired rotational angle of the drive shaft of motor 5 are compared with each other at step 104. If the actual rotational angle is equal to the desired rotational angle, control returns to step 102. Otherwise, if the actual rotational angle is not equal to the desired rotational angle, control proceeds to step 105. At step 105, a determination is made whether drive motor 5 of motor actuator 4 is locked. If motor 5 is not locked, control jumps to step 107. At step 107, a drive signal is sent to motor 5 and the drive shaft of motor 5 begins to rotate. The drive shaft of motor 5 continues to rotate in accordance with the active drive signal. During the rotation of the drive shaft of motor 5, the actual rotational angle of the drive shaft is compared with the desired rotational angle at step 108. If the actual rotational angle corresponds to the desired rotational angle, control jumps to step 110. At step 110, the drive signal becomes inactive and the rotation of the drive shaft is stopped. Otherwise, while the actual rotational angle is not equal to the desired rotational angle, control proceeds to step 109. At step 109, at determination is made whether motor 5 is locked. If motor 5 is locked, control passes to step 110, and again, the drive signal becomes inactive and the rotation of the drive shaft is stopped. If motor 5 is not locked, control returns to step 107 and the rotation continues.

At step 105, if motor 5 is locked, control passes to step 106. At step 106, a determination is made whether the conditions of lock release are satisfied. These conditions will be explained in detail below.

Figure 3:
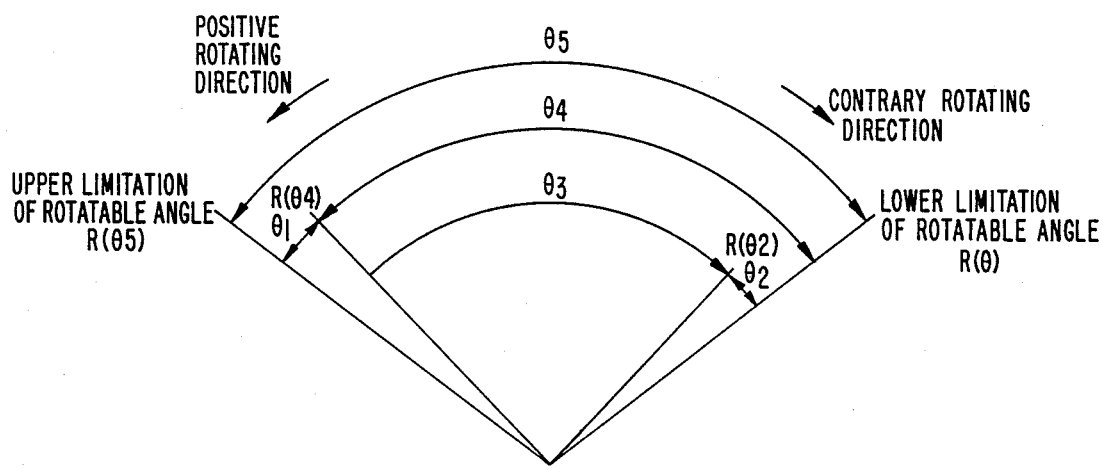
FIG. 3 is a explanatory view of an actual angle and a desired angle of a rotatable angle of a motor.

FIG. 3 schematically illustrates the range of angles over which the drive shaft of motor 5 may be rotated. $O_5$ represents the angle between the upper and lower rotational limits of the drive shaft of motor 5 as measured from the lower rotational limit. $O_1$ and $O_2$ represent predetermined angles as measured from the upper rotational limit and lower rotational limit, respectively. $O_1$ and $O_2$ generally represent small angular displacements from the upper and lower rotational limits. At step 110, the rotation of the drive shaft is stopped and control returns to step 106. At step 106, a determination is made whether the shaft of motor 5 which is locked against rotational motion in a particular direction is within the angular displacement $O_1$ of the upper rotational limit or within the angular displacement $O_2$ of the lower rotational limit. If so, and in addition the drive signal generated by the temperature control circuit is such as to cause the drive shaft to rotate in a direction opposite to the direction in which the shaft is locked against rotation, the lock is released and the shaft is free to rotate in the opposite direction.

With reference to FIG. 4, a flow chart describing the lock release operation is shown. The determination of lock release is started at step 201. At step 202, a determination is made whether the drive shaft of motor 5 is locked against further rotation in what may be termed the positive rotation direction. This direction is indicated in FIG. 3. If the drive shaft of motor 5 is locked against further rotation in the positive rotation direction, control proceeds to step 203. At step 203, a determination is made whether the actual rotational angle of the drive shaft is greater than $O_4$ and less than $O_5$, i.e., within the range of angles defined by $O_1$. If the actual rotational angle of the drive shaft is not within the range of angles denoted by $O_1$, control jumps to step 207, and the lock of the drive shaft of motor 5 against further rotation in the positive rotation direction is maintained. Otherwise, if the actual rotation angle of the drive shaft is within the range of angles denoted by $O_1$ control passes to step 205. At step 205, a determination is made whether the generated drive signal will cause rotation in the negative rotation direction. If such a drive signal is not being generated, control passes to step 207, and the lock of the drive shaft is maintained to prevent damage to the motor. If the generated drive signal will cause rotation in the negative rotation direction, control passes to step 208, and the lock of the drive shaft is released.

At step 202, if the drive shaft of motor 5 is not locked against further rotation in the positive rotation direction, control passes to step 204. At step 204, a determination is made whether the actual rotational angle of the drive shaft is greater than the lower rotational limit of the drive shaft of motor 5 and less than $O_2$. If the actual rotational angle is not within the above range, control passes to step 207, and the lock of motor 5 is maintained. Otherwise, if the actual rotational angle is within this range control passes to step 206. At step 206, a determination is made whether the generated drive signal will cause rotation in the positive rotation direction. If such a drive signal is not being generated, control passes to step 207, and the lock of motor 5 is maintained to prevent damage to the motor. Otherwise, if such a signal is being generated, control passes to step 208, and the lock of motor 5 is released.

In short, a determination is made whether the conditions of lock release are satisfied in step 106. If the above lock release conditions are not satisfied, control returns to step 102. If the lock release conditons are satisfied, control passes to step 107, and the drive shaft of motor 5 is rotated in the direction opposite to that in which the shaft had been locked against further rotation. This arrangement permits continued operation of the air conditioning system if the locking of the drive motor is caused by differences in the stroke of the air mix damper and the motor actuator or an error in the connection of the air mix damper to the motor actuator.

This invention has been described in detail in connection with the preferred embodiment, but this embodiment is for example only, and the invention should not be constructed as limited thereto. It should be apparent to those skilled in the art that other variations or modifications can be made within the scope of the this invention.

We claim:

1. In an automotive air conditioning system including an air mix damper and a damper position control device, said air mix damper controlling the temperature of the air blown into a compartment by controlling the mixture of cool air and heated air, said damper position control device including a motor actuator and a control circuit, said motor actuator including a motor driving the air mix damper, a rotation control switch provided with a regulator regulating upper and lower rotatonal limits of said motor, and a position detector generating position signals corresponding to the rotational angle of the shaft of said motor, said control circuit generating a drive signal which drives said motor actuator in accordance with a plurality of temperature signals and the position signals generated by said position detector, an improvement comprising:

lock detector means for detecting if the shaft of said motor is locked against rotational motion in a first rotational direction;

displacement determination means in said control circuit for determining whether said motor is within a first predetermined angular displacement from the upper rotational limit or within a second predetermined angular displacement from the lower rotational limit; and lock release means in said control circuit responsive to said displacement determination means and the drive signal which drives said motor actuator for releasing said motor to permit rotational motion in a second rotational direction after said motor has been locked against rotational motion in the first rotational direction, said lock release means releasing said motor if said motor is within the first predetermined angular displacement from the upper rotational limit or within the second predetermined angular displacement from the lower rotational limit and if the drive signal causes said motor to rotate in the second rotational direction.

* * * * *